United States Patent [19]

Powell, Sr.

[11] 4,067,432
[45] Jan. 10, 1978

[54] BIN FILLING MECHANISM

[76] Inventor: Harry C. Powell, Sr., Faber, Va. 22938

[21] Appl. No.: 485,320

[22] Filed: July 2, 1974

[51] Int. Cl.² .................. B65G 41/00; B65G 65/32
[52] U.S. Cl. ................................. 198/302; 198/317; 198/318; 198/631; 198/865; 214/17 CA
[58] Field of Search .................. 198/65, 69, 117–120, 198/120.5, 124–126, 233, 302, 317, 318, 631, 865; 214/17 C, 17 CA

[56] References Cited

U.S. PATENT DOCUMENTS

| 399,312 | 3/1889 | Arbogast | 198/118 |
|---|---|---|---|
| 431,724 | 7/1890 | Nagle | 198/120.5 |
| 1,224,384 | 5/1917 | Kaukaine | 198/233 |
| 2,395,075 | 2/1946 | Smith | 198/233 |
| 2,452,978 | 11/1948 | Woldring | 198/233 |
| 2,568,865 | 9/1951 | Neighbour et al. | 198/233 |
| 3,147,846 | 9/1964 | Huntoon | 198/69 |
| 3,225,744 | 12/1965 | Procter | 198/233 |
| 3,254,755 | 6/1966 | O'Brien | 214/17 CA |
| 3,307,679 | 3/1967 | Ziegler et al. | 198/125 |
| 3,578,146 | 5/1971 | Mehlschau | 214/17 CA |

Primary Examiner—Evon C. Blunk
Assistant Examiner—Jeffrey V. Nase
Attorney, Agent, or Firm—Cushman, Darby & Cushman

[57] ABSTRACT

A bin filling mechanism comprising an inner frame mounted for oscillation about an intermediate frame and carrying a pivotally mounted product conveying means thereon. The intermediate frame is vertically adjustable with respect to a main frame to allow adaptation of the device to variously sized feed mechanisms. A sensing means of the bin end of the product conveying means initiates raising of the product conveying means as the bin is filled with product. A slotted disc and rod arrangement provides for oscillation of the whole inner frame structure to insure even distribution of product within the bin.

7 Claims, 5 Drawing Figures

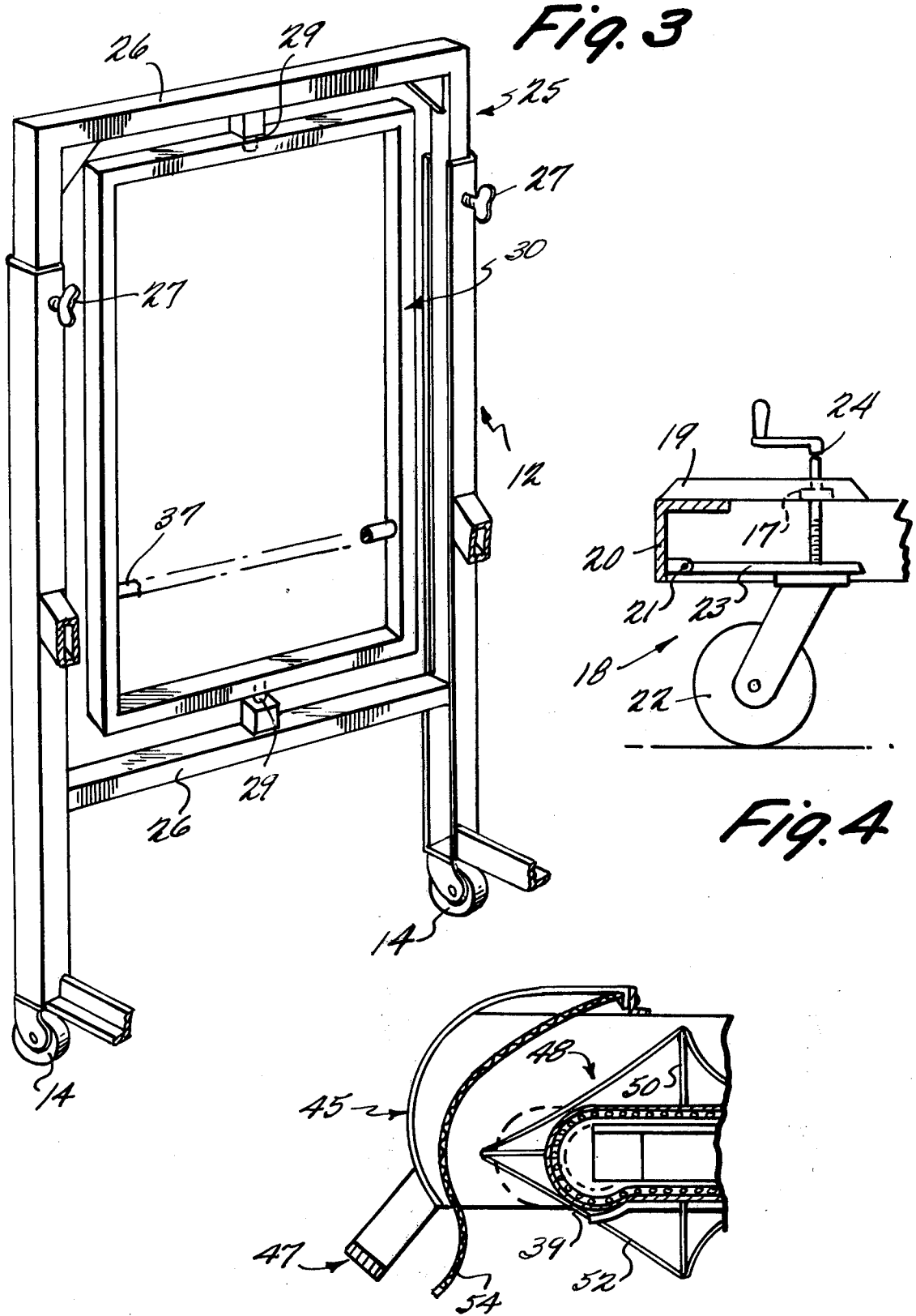

BIN FILLING MECHANISM

BACKGROUND OF THE INVENTION

The present invention pertains to apparatus for filling bins, especially with easily bruised product such as fruits and vegetables.

Many types of bin filling devices have been employed in the past in the fruit and vegetable industries - an example of a typical prior art device is shown in U.S. Pat. No. 3,147,846. While these devices have been generally satisfactory, there still have been assorted problems with damage of the product when filling, even distribution of the product in the bin, adjustment of the filling device to accommodate variously sized feed apparatus, and safety of personnel working in the vicinity of the fill devices.

SUMMARY OF THE INVENTION

With the apparatus of the present invention a means that is completely portable and is not dependent upon particular bin location is provided for filling of bins uniformly and without damage to the fill product. Specifically, a flighted elevator product conveying means with an end-structure that senses the amount of accumulated product in a bin to be filled is mounted on inner frame. The inner frame is pivotally mounted about a vertical axis on an intermediate frame, which in turn is telescopically mounted in an outer or main frame. The height of the intermediate frame relative to the main frame is easily adjusted by way of their telescopic engagement to thereby allow reception of variously sized feed apparatus by the flighted elevator. An automatic means is provided for oscillating the inner frame structure on which the elevator is mounted about its vertical axis. This oscillation provides for uniform distribution of the product in the bin, and by preventing the accumulated product from heaping and then falling, it prevents damage to the product. Since the bin remains stationary during the whole filling process, it may be located anywhere and the safety hazard associated with a rotating heavy bin is eliminated. The bin fill sensor on the product conveying means end-structure operates a switch which in turn operates a solenoid valve, which in turn operates an hydraulic device to raise the elevator until the elevator end-structure is clear of accumulated product.

Since the horizontal oscillation of the elevator structure allows the bin to be located anywhere, it is convenient to take advantage of this feature by making the whole bin filling device portable. Portability is facilitated by mounting casters on the bottom of the main frame. However, since it is also necessary to prevent inadverent movement of bin filler during its bin filling operation, one of the casters is made vertically adjustable so that either it or legs mounted on the frame can support the bin filling device.

OBJECTS OF THE INVENTION

It is an object of the present invention to provide for efficient filling of bins without damage to the products with which the bin is to be filled.

It is a further object of the invention to provide a bin filling device that is completely portable and not dependent upon bin location.

It is a further object of this invention to provide for adjustment of the bin filling device to accomodate variously sized feed apparatus.

It is a further object of the present invention to provide a bin filling device that is easily moved yet remains stationary during operation.

Other objects of the invention will become clear from an examination of the detailed description of the invention.

BRIEF DESCRIPTION OF THE DRAWINGS

FIG. 3 is a detail view of the frame members of the bin filler;

FIG. 4 is a detail view of the vertically adjustable caster for moving the bin filler;

FIG. 5 is a detail sectional view of the elevator end-structure.

DETAILED DESCRIPTION OF THE PREFERRED EMBODIMENT

Figure 1:
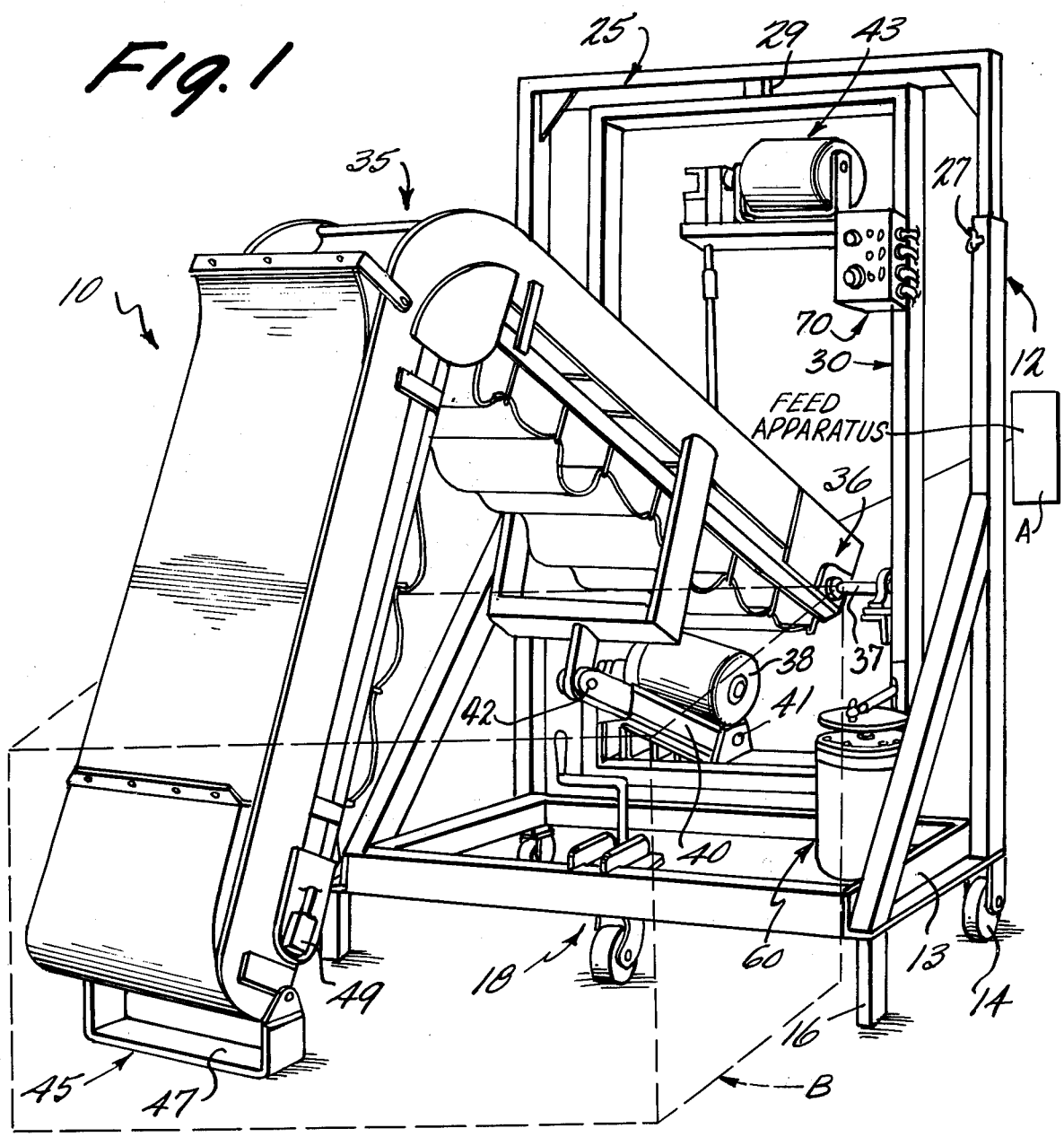
FIG. 1 is a perspective view of an exemplary bin filler according to the teachings of the present invention with portions of the frame thereof broken away for clarity.

The bin filling device according to the teachings of the present invention is shown generally at 10 in FIG. 1. A vertically extending main frame member 12 having casters 14 mounted on the bottom thereof is rigidly connected to a frame portion 13. The frame portion 13 is supported by the casters 14 and by either legs 16 or a vertically adjustable caster assembly, shown generally at 18, mounted between the legs 16. As shown more clearly in FIG. 4, the vertically adjustable caster includes a horizontal plate portion 19 rigidly connected to frame portion 13 and having a downwardly extending plate portion 20. The plate portion 20 is pivotally connected at 21 to a support plate 23 of a caster 22. A crank-handle screwthreaded rod 24 extends through a screw threaded opening 17 in plate 19 and bears upon caster-supporting plate 23. It will thus be seen that when the rod 24 is turned the caster 22 will be moved vertically - either into engagement with the ground so that it supports the front end of mechanism 10 and allows (along with casters 14) movement thereof, or spaced from the ground so that the legs 16 support the front end of mechanism 10 thereby holding the mechanism 10 in the position into which it is moved.

Telescopically engageable with and mounted in main frame 12 is an intermediate frame member, shown generally at 25. As can clearly be seen in FIGS. 1 and 3, the intermediate frame 25 is vertically adjustable with respect to the relatively stationary main frame 12, and is held in the relative vertical position to which it is raised by screws 27. On the cross members 26 of the intermediate frame 25 are pivots 29. Mounted on pivots 29 for oscillation about a vertical axis with respect to the intermediate frame member 25 is inner frame member 30. The inner frame member 30 carries the flighted product conveying means, shown generally at 35, and operating mechanisms therefor therewith. Vertical adjustment of the intermediate frame member 25 will thus result in vertical adjustment of the intake 36 of the product conveying means 35, making it adaptable to different feed mechanisms. The product conveying means 35 is pivoted by rod 37 to the inner frame member 30 so that it may pivot about a horizontal axis resulting in adjustment of its vertical position. Movement about this horizontal axis is provided by a conventional hydraulic cylinder 40 connected at 41 to the inner frame member 30, and at 42 to a portion of the conveying means 35 spaced from the pivot point at 37. A motor 43 and fluid lines associated therewith supply fluid under pressure for operating the hydraulic cylinder 40 and thus either raising and lowering the conveying means end-structure 45 with respect to the ground or a bin (shown in dotted line at B in FIG. 1) to be filled thereon. Activation of motor assembly 43 and thus hydraulic motor 40 is controlled by a padded paddle member 47 mounted on the conveying means end-structure 45. When the paddle 47 engages product within a bin it pivots, activating limit switch 49 which in turn activates motor assembly 43. The end-structure 45 is then raised until paddle 47 no longer engages any product, whereby limit switch 49 is deactivated.

A cross-section of the conveying means end-structure 45 is shown in FIG. 5. A flighted conveyor is shown generally at 48 and comprises divider plates 50 connected at one end to a chain drive 39, and at the other end to a fabric strip 52. A conventional motor 38 powers the chain drive 39. The fabric strip 52 cooperating with the plates 50 forms a series of flexible pockets for gently carrying product - such as fruit - from the start of the conveying means - shown generally at 36 - to the end-structure 45, whereat the product is deposited into a bin. A pivotally mounted flexible flap 54 is disposed between the end of the conveying means and the bin for gently breaking the fall of the product, thereby preventing bruising of it upon falling into the bin.

Figure 2:
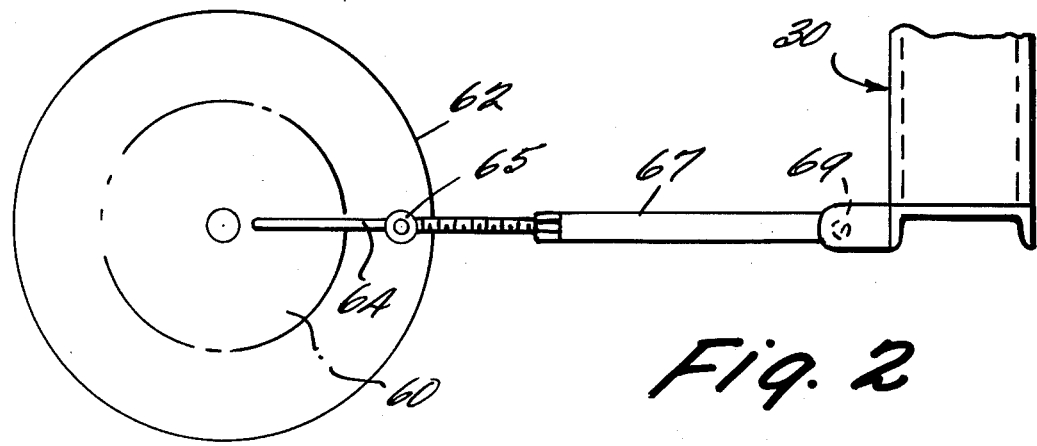
FIG. 2 is a detail top plan view of the device for oscillating the product conveying means about a vertical axis.

In addition to being vertically movable with respect to inner frame member 30, the conveying means 35 is oscillatable with respect to the main frame 12, 13 and a bin to be filled with product from the conveying means. The means for oscillating the inner frame 30 - and thus the conveying means 35 - with respect to the main frame 12, 13 is illustrated most clearly in FIG. 2. It includes a gear motor 60 - rigidly attached to the frame member 13 - which rotates a disc 62 connected to the operating shaft of the motor 60. The disc 62 contains a radial slot 64 therein which engages a pin 65 of an adjustable connecting rod 67. The adjustable connecting rod 67 is pivoted at 69 to the inner frame member 30, and thus as the disc rotates the frame member 30 will be oscillated.

A main control box 70 may be employed for manually controlling all the motors associated with the mechanism 10.

The main components of the bin filling mechanism 10 having been described, its operation will now be set forth. The vertically adjustable caster 22 is moved into engagement with the ground by rotating rod 24, and then the mechanism 10 is moved to any desired location and a bin placed under end-structure 45, the structure 45 being close to the bottom of the bin. Then the caster 22 is moved out of engagement with the ground so that the legs 16 will support the front end of mechanism 10.

A feed mechanism (shown schematically at A in FIG. 1) is then brought into the proximity of the end 36 of the conveying means 35, and the intermediate frame 25 is adjusted with respect to the main frame 12 until the feed mechanism and the conveying means end 36 are the same height. Then screws 27 are tightened and the relative vertical positions between the frame members 12 and 25 secured.

Then motor 38 for driving the conveying means is started, as is motor 60 for oscillating the conveying means with respect to the frame members 12, 13 and 25. As fruit or other products is delivered by the pockets formed by plates 50 and fabric covering 52 of the conveying means, it will gently fall into the bin, and be evenly distributed therein by the oscillation of the conveying means 35. When the fruit piles up in the bin, it will engage paddle 47 of the end-structure 45, which will actuate limit switch 49, which activates motor assembly 43 and subsequently hydraulic cylinder 40. Hydraulic cylinder 40 will then raise the end-structure 45 with respect to the bin until paddle 47 is no longer in engagement with the product within the bin, whereupon switch 49 will be de-actuated, and raising of the end-structure 45 will cease. The contionuous conveying and oscillating, and the intermittent raising will continue until the bin is full of product, whereupon a new bin will be moved into position (or the mechanism 10 moved to a position for operative communication with another bin), and the operation will be repeated.

It will thus be seen that a bin filling mechanism has been disclosed that eliminates the safety hazards associated with rotation of a heavy bin, is readily movable to any location and thus can be utilized with feed mechanisms and bins placed anywhere, and efficiently fills a bin with product without damaging the product, fulfilling all the objects of the invention. While the bin filling mechanism has been disclosed in what is presently conceived to be the most preferred and practical embodiment, it will be apparent to one of ordinary skill in the art that many modifications within the scope of the invention are possible. For instance, other means could be employed for raising and lowering the conveying means and securing the vertical orientation of the main and intermediate frames, and another type of conveying means could be used. Other modifications are also possible, thus the invention is not to be limited to the details disclosed, but is to be accorded the full scope of the claims so as to embrace any and all equivalent structures and devices.

I claim:

1. A bin filling mechanism comprising
   a. a product conveying means for directly depositing bruisable product into a bin from a feed apparatus,
   b. sensing means on said product conveying means for (i) sensing accumulated product in said bin and (ii) initiating adjustment of the vertical position of said product conveying means,
   c. raising means for adjusting the vertical position of said product conveying means in response to said sensing means,
   d. mounting means mounting said product conveying means for oscillation about a vertical axis, including an inner frame on which said product conveying means is mounted, and an intermediate frame upon which said inner frame is pivotally mounted, and
   e. oscillating means for oscillating said product conveying means about said axis so that said bin is uniformly filled with product from said feed apparatus by continuous oscillation and intermittent vertical adjustment of said product conveying means, said oscillating means comprising a motor operated disc with a radial slot therein, and a rod operatively engaging a portion of said inner frame and having a portion thereof operatively received by said slot whereby rotary motion of said motor is converted to oscillating motion of said inner frame and said product conveying means mounted thereon.

2. A bin filling mechanism as recited in claim 1 further comprising a main frame for supporting all components of said bin filling mechanism, said main frame having a bottom structure, two casters mounted on the bottom of said main frame and two legs mounted on said bottom structure, and a vertically adjustable caster mounted between said legs, said vertically adjustable caster when in one position thereof supporting said main frame and spacing said legs from the ground, and in another position thereof not supporting said main frame but allowing said legs to engage the ground and so support said main frame.

3. A bin filling mechanism as recited in claim 2 wherein said vertically adjustable caster includes a first plate pivotally mounting said caster to a second plate, said second plate rigidly attached to said main frame, and a threaded rod threadable through said second plate into operative engagement with a said first plate.

4. A bin filling mechanism comprising
 a. a product conveying means for directly depositing bruisable product from feed apparatus into a bin,
 b. sensing means on said product conveying means for (i) sensing the accumulated product in said bin and (ii) initiating adjustment of the vertical position of said product conveying means,
 c. means for uniformly filling said bin and minimizing product damage while allowing said bin to remain stationary during the filling operation wherein said means includes (i) raising means for adjusting the vertical position of said product conveying means in response to said sensing means, (ii) mounting means for mounting said conveying means for oscillation about a vertical axis, and (iii) oscillating means for oscillating said product conveying means about said vertical axis, and
 d. a main frame for supporting all components of said bin filling mechanism, said main frame having a bottom structure, two casters mounted on the bottom of said main frame and two legs mounted on said bottom structure, and a vertically adjustable caster mounted between said legs, said vertically adjustable caster when in one position thereof supporting said main frame and spacing said legs from the ground, and in another position thereof not supporting said main frame but allowing said legs to engage the ground and so support said main frame.

5. A bin filling mechanism as recited in claim 4 wherein said means for minimizing product damage further includes a padded paddle associated with said sensing means and a flexible flap at the end of said product conveying means for gently breaking the fall of product from said conveying means into said bin.

6. A bin filling mechanism as recited in claim 4 wherein said mounting means includes an inner frame on which said product conveying means is mounted, and an intermediate frame upon which said inner frame is pivotally mounted.

7. A bin filling mechanism as recited in claim 6 wherein said oscillating means comprises a motor operated disc with a radial slot therein, and a rod operatively engaging a portion of said inner frame and having a portion thereof operatively received by said slot whereby rotary motion of said motor is converted to oscillating motion of said inner frame and said product conveying means mounted thereon.

* * * * *